United States Patent [19]

Taleyarkhan

[11] Patent Number: 4,716,011
[45] Date of Patent: Dec. 29, 1987

[54] BWR FUEL ASSEMBLY BOTTOM NOZZLE WITH ONE-WAY COOLANT FLOW VALVE

[75] Inventor: Rusi P. Taleyarkhan, Pittsburgh, Pa.

[73] Assignee: Westinghouse Electric Corp., Pittsburgh, Pa.

[21] Appl. No.: 785,816

[22] Filed: Oct. 9, 1985

[51] Int. Cl.[4] .................. G21C 3/32; G21C 15/00
[52] U.S. Cl. .................. 376/281; 376/352; 137/512
[58] Field of Search .............. 376/352, 179, 281, 443, 376/444; 137/512, 512.1, 527; 251/212

[56] References Cited

U.S. PATENT DOCUMENTS

| | | | |
|---|---|---|---|
| 3,389,056 | 6/1968 | Frisch . | |
| 3,445,863 | 5/1969 | Wada | 137/512 |
| 3,988,203 | 10/1976 | Kuzavkov et al. | 376/352 |
| 4,032,398 | 6/1977 | Cross et al. | 376/352 |
| 4,043,868 | 8/1977 | Irion et al. | 376/281 |
| 4,095,514 | 6/1978 | Roy et al. | 251/212 |
| 4,249,567 | 2/1981 | Weiss | 137/512 |
| 4,277,310 | 7/1981 | Braun et al. | 376/281 |
| 4,302,289 | 11/1981 | Lindgren et al. . | |
| 4,348,355 | 9/1982 | Nylund . | |
| 4,406,022 | 9/1983 | Roy | 137/512 |

FOREIGN PATENT DOCUMENTS

| | | | |
|---|---|---|---|
| 1150423 | 7/1983 | Canada . | |
| 0092395 | 5/1984 | Japan | 376/352 |
| 1295222 | 11/1972 | United Kingdom | 376/281 |
| 1421826 | 1/1976 | United Kingdom | 376/352 |

Primary Examiner—Harvey E. Behrend

[57] ABSTRACT

A BWR fuel assembly includes a bundle of elongated fuel rods disposed in side-by-side relationship so as to form an array of spaced fuel rods, an outer tubular flow channel surrounding the fuel rods so as to direct flow of coolant-moderator fluid along the fuel rods, and bottom and top nozzles mounted at opposite ends of the flow channel and having an inlet and outlet respectively for allowing entry and exit of coolant fluid into and from the flow channel and along the fuel rods contained therein. The BWR fuel assembly includes an improvement in the form of a coolant flow direction control device mounted in the bottom nozzle of the fuel assembly and being operable to open the inlet thereof to flow of coolant fluid in an inflow direction into the flow channel through the bottom nozzle inlet but close the inlet to flow of coolant fluid from the channel through the bottom nozzle inlet upon reversal of coolant liquid flow from the inflow direction. In an exemplary form, the coolant flow direction control device is a one-way or unidirectional flow check valve positioned across the inlet of the fuel assembly bottom nozzle for sensing the direction of coolant flow and automatically opening when the flow direction sensed is into the bottom nozzle and closing when the flow direction sensed is out of the bottom nozzle.

1 Claim, 5 Drawing Figures

BWR FUEL ASSEMBLY BOTTOM NOZZLE WITH ONE-WAY COOLANT FLOW VALVE

CROSS REFERENCE TO RELATED APPLICATIONS

Reference is hereby made to the following copending applications dealing with related subject matter and assigned to the assignee of the present invention:

1. "Nuclear Fuel Assembly" by Robert F. Barry et al, assigned U.S. Ser. No. 368,555, and filed Apr. 15, 1982 (W.E. 50,013).
2. "Coolant Flow Paths Within a Nuclear Fuel Assembly" by Pratap K. Doshi, assigned U.S. Ser. No. 602,089 and filed Apr. 19, 1984, a continuation of U.S. Ser. No. 368,552, filed Apr. 15, 1982 and now abandoned (W.E. 50,105C).
3. "Water Tubes Arranged In Cross-Like Pattern In A Fuel Assembly" by Carl A. Olson et al, assigned U.S. Ser. No. 642,844 and filed Aug. 20, 1984 (W.E. 51,464).
4. "Cross Brace For Stiffening A Water Cross In A Fuel Assembly" by C. K. Lui, assigned U.S. Ser. No. 672,042 and filed Nov. 16, 1984 (W.E. 52,237).
5. "Improved Boiling Water Nuclear Reactor Fuel Assembly" by Rusi Taleyarkhan, assigned U.S. Ser. No. 726,602 and filed May 2, 1985 (W.E. 52,509).
6. "BWR Fuel Assembly With Water Flow Mixing Chamber At FuelBundle/Water Cross Entrance" by Rusi Taleyarkhan, assigned U.S. Ser. No. 746,619 and filed June 19, 1985 (W.E. 52,755).

BACKGROUND OF THE INVENTION

1. Field of the Invention

The present invention relates generally to fuel assemblies for a nuclear reactor and, more particularly, is concerned with a boiling water reactor (BWR) fuel assembly having a one-way coolant flow valve at its bottom nozzle inlet which allows inflow of coolant but automatically closes upon flow reversal to prevent rapid depletion of fuel assembly coolant inventory in the event of a loss of coolant accident (LOCA).

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In a nuclear reactor generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. Specifically, in a BWR the fuel assemblies are typically grouped in clusters of four with one control rod associated with each four assemblies. The control rod is insertable within the fuel assemblies for controlling the reactivity of the core. Each such cluster of four fuel assembies surrounding a control rod is commonly referred to as a fuel cell of the reactor core.

A typical BWR fuel assembly in the cluster is ordinarily formed by a N by N array of the elongated fuel rods. The bundle of fuel rods are supported in laterally spaced-apart relation and encircled by an outer tubular channel having a generally rectangular cross-section. The outer flow channel extends along substantially the entire length of the fuel assembly and interconnects a top nozzle with a bottom nozzle. The bottom nozzle fits into the reactor core support plate and serves as an inlet for coolant flow into the outer channel of the fuel assembly. Coolant enters through the bottom nozzle and thereafter flows along the fuel rods removing energy from their heated surfaces.

During LOCA incident (e.g. a recirculation line break), a break in the primary circuit causes coolant depletion from the reactor core. Coolant in each fuel assembly then reverses its upward flow direction and exits downward through the inlet of the fuel assembly bottom nozzle into the lower plenum of the core and then out of the primary circuit. This loss of coolant causes the fuel in the assembly to overheat (after occurrence of critical heat flux (CHF)) and possibly start to melt until the emergency core cooling systems (ECCS) get activated and provide sufficient heat transfer. In plants subject to such shortcoming in LOCA performance, NCR guidelines restrict operation of plants to remain at or below a certain power level. Such plants are often referred to as "LOCA limited."

Consequently, it is readily apparent that a need exists for some means to prevent short-term depletion of coolant from the fuel assemblies due to occurrence of a LOCA event so that efficient heat transfer can still proceed until activation of the ECCS. The implementation of such means would allow LOCA limited plants to be operated at higher power levels, resulting in significant gains in economy and safety.

SUMMARY OF THE INVENTION

The present invention provides a coolant flow direction control device in the fuel assembly bottom nozzle which is designed to satisfy the aforementioned needs. Underlying the present invention is a recognition that the provision of a simple one-way or unidirectional flow (check) valve at the bottom nozzle inlet would allow coolant to enter but not leave the fuel assembly through the bottom nozzle. The valve automatically (by fluid action) closes with flow reversal to contain the coolant inventory of the fuel assembly within it and thereby significantly improve LOCA cooling. Thus, as external recirculation of coolant flow decays to zero upon a loss of coolant and as coolant flow reversal through the fuel assembly begins, the unidirectional valve shuts off coolant depletion from the bottom nozzle. This allows for "pool boiling" heat transfer to occur. Pool boiling in the fuel assemblies produces a pressure gradient which causes coolant flow from the bypass into the fuel assembly (via the bypass flow holes in the bottom nozzle), restricting temperature rise in the assembly and preventing fuel rod overheating before the start of the ECCS.

The present invention also provides for improved performance (cooling) during all three modes of ECCS: core spray, interstitial injection and in-vessel injection. Further, the impact of the valve on thermal hydraulics, nuclear and structural performance characteristics are largely beneficial in nature.

In summary, the present invention provides for significant improvements in LOCA performance and reduced negligible fuel rod temperature rise. These improvements are felt to be substantial enough to overcome or minimize any regulatory LOCA constraints on maximum linear heat generation rate (LHGR) and average planar heat generation rates (APLHGR), respectively. This results in high power operation, and, therefore, improved fuel cycle economics and safety.

Accordingly, the present invention sets forth an improved feature in a BWR fuel assembly. The fuel assembly includes a bundle of elongated fuel rods disposed in side-by-side relationship so as to form an array of spaced fuel rods, an outer tubular flow channel surrounding the fuel rods so as to direct flow of coolant/moderator fluid along the fuel rods, and bottom and top nozzles mounted at opposite ends of the flow channel and having an inlet and outlet respectively for allowing entry and exit of coolant fluid into and from the flow channel and along the fuel rods contained therein. The improved feature of the fuel assembly comprises a coolant flow direction control device operatively disposed in the bottom nozzle of the fuel assembly so as to open the inlet to flow of coolant fluid in an inflow direction into the flow channel through the bottom nozzle inlet but close the inlet to flow of coolant fluid from the channel through the bottom nozzle inlet upon reversal of coolant liquid flow from the inflow direction.

More particularly, the coolant flow direction control device is in the form of a one-way or unidirectional flow check valve positioned across the inlet of the fuel assembly bottom nozzle for sensing the direction of coolant flow and automatically opening when the flow direction sensed is into the bottom nozzle and closing when the flow direction sensed is out of the bottom nozzle. In an exemplary embodiment, the valve has a plurality of outer portions mounted to the bottom nozzle adjacent to the inlet and a plurality of inner portions being connected to the respective outer portions for pivotal movement toward and away from one another between lowered and raised positions.

The inner valve portions are configured to extend in close fitting relationship adjacent to one another and coplanarly across the inlet so as to close it when disposed in their respective lowered positions and to extend in generally parallel relationship remote from one another so as to open the inlet when disposed in their respective raised positions. The outer valve portions, in being mounted to the bottom nozzle, are configured for attachment on respective circumferentially spaced sectors of an annular surface being defined in the bottom nozzle and concentrically surrounding the inlet thereof. The inner valve portions, when in their respective lowered positions, are configured for seating on respective circumferentially spaced segments of the annular surface which alternate with the spaced sectors of the annular surface and constitute the remainder thereof. When in their raised positions, the inner valve portions extend toward the bottom nozzle in the direction of coolant flow into the bottom nozzle. Their seating on the annular surface when in their lowered positions stops them from pivoting past the lowered position so as to extend away from the bottom nozzle and allow reverse flow of coolant therefrom.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
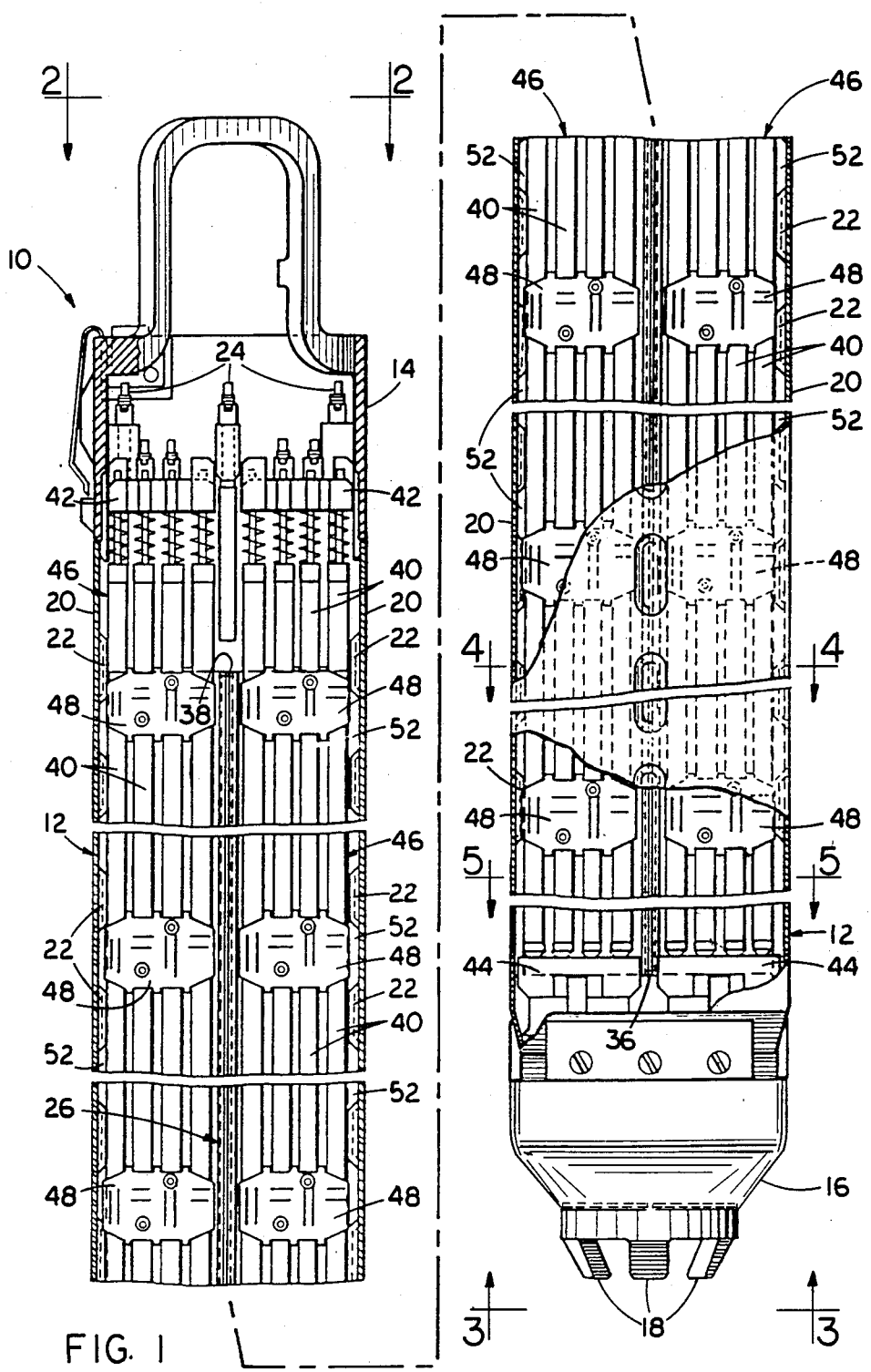
FIG. 1 is an elevational view, with parts broken away and sectioned for clarity, of a BWR nuclear fuel assembly in which the improved feature of the present invention is employed.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Figure 2:
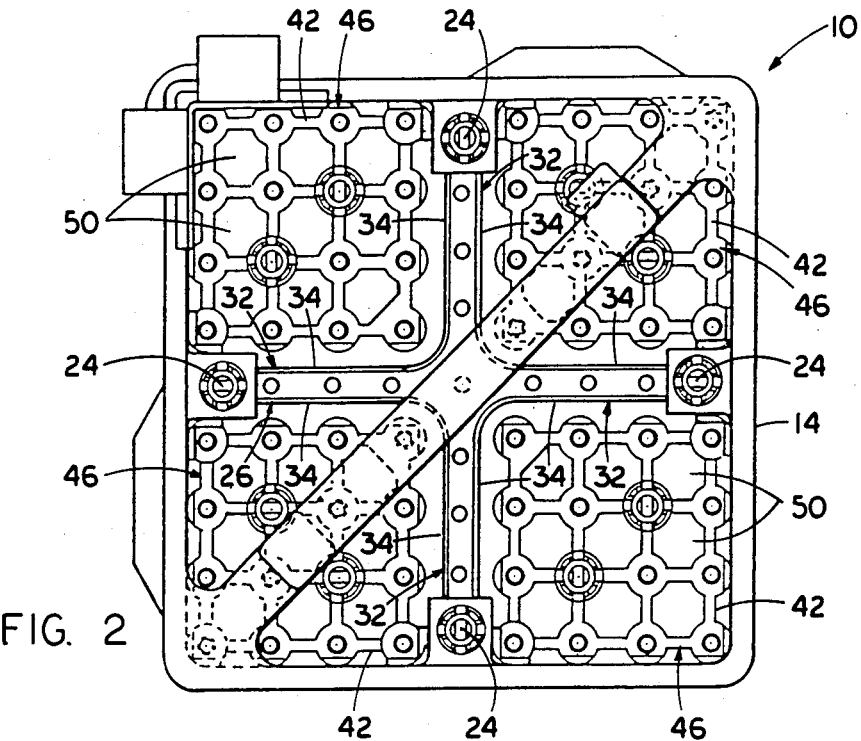
FIG. 2 is an enlarged top plan view of the fuel assembly as seen along line 2—2 of FIG. 1.
Figure 3:
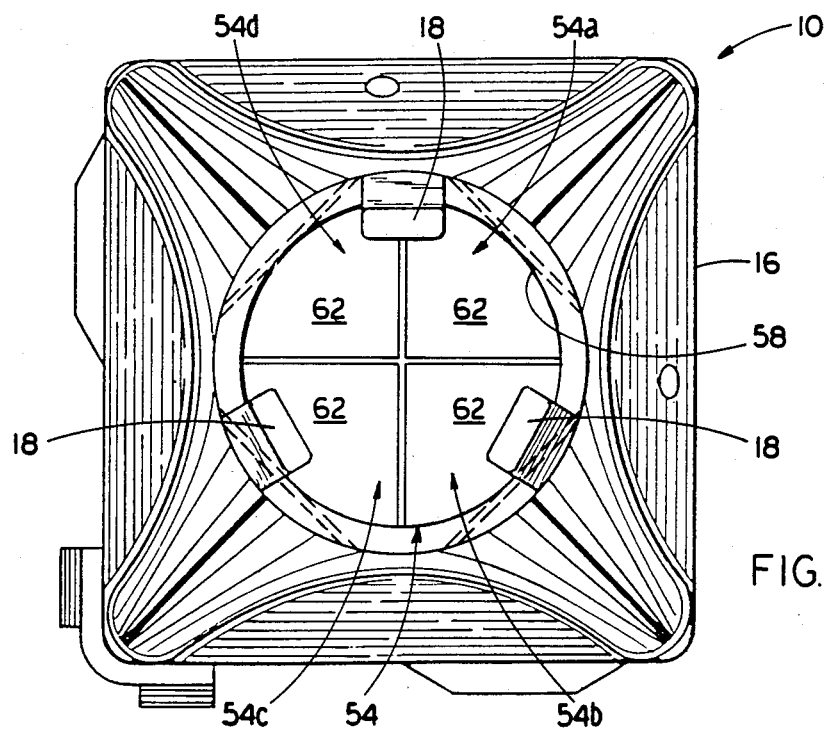
FIG. 3 is an enlarged bottom plan view of the fuel assembly as seen along line 3—3 of FIG. 1, showing the coolant flow direction control device constituting the improved feature of the present invention and being in the form of a unidirectional or one-way check valve positioned across and closing the inlet of the fuel assembly bottom nozzle.

Referring now to the drawings, and particularly to FIGS. 1 to 3, there is shown a nuclear fuel assembly, generally designated 10 for a boiling water nuclear power reactor (BWR), in which the improvement of the present invention is incorporated. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

For improving neutron moderation and economy, a hollow water cross, as seen in FIGS. 1 and 2 and generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongated, generally L-shaped, metal angles or sheet members 34 that extend generally along the entire length of the channel 12. The sheet members 34 of each panel 32 are interconnected and spaced apart by a series of elements in the form of dimples (not shown) formed therein and extending therebetween. The dimples are provided in opposing pairs that contact each other along the lengths of the sheet members to maintain the facing portions of the member in a proper spaced-apart relationship. The pairs of contacting dimples are connected together such as by welding to ensure that the spacing between the sheet members 34 forming the panels 32 of the central water cross 26 is accurately maintainedd.

The hollow water cross 26 is mounted to the angularly-displaced walls 20 of the outer channel 12. Preferably, the outer, elongated lateral ends of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26. Also, the water cross 26 has a lower flow inlet end 36 and an opposite upper flow outlet end 38 which each communicate with the inner channel 28 for providing subcoolant flow therethrough.

Disposed within the channel 12 is a bundle of fuel rods 40 which, in the illustrated embodiment, number sixty-four and form an 8×8 array. The fuel rod bundle is, in turn, separated into four mini-bundles thereof by the water cross 26. The fuel rods 40 of each mini-bundle, such being sixteen in number in a 4×4 array, extend in laterally spaced apart relationship between an upper tie plate 42 and a lower tie plate 44. The fuel rods in each mini-bundle are connected to the upper and lower tie plates 42,44 and together therewith comprise a separate fuel rod subassembly 46 within each of the compartments 30 of the channel 12. A plurality of grids 48 axially spaced along the fuel rods 40 of each fuel rod subassembly 46 maintain the fuel rods in their laterally spaced relationships. The lower and upper tie plates 42,44 of the respective fuel rod subassemblies 46 have flow openings 50 defined therethrough for allowing the flow of the coolant/moderator fluid into and from the separate fuel rod subassemblies. Also, coolant flow paths provide flow communication between the fuel rod subassemblies 46 in the respective separate compartments 30 of the fuel assembly 10 through a plurality of openings 52 formed between each of the structural ribs 22 along the lengths thereof. Coolant flow through the openings 52 serves to equalize the hydraulic pressure between the four separate compartments 30, thereby minimizing the possibility of thermal hydrodynamic instability between the separate fuel rod subassemblies 46.

The above-described basic components of the BWR fuel assembly 10 are known in the prior art, being disclosed particularly in the Doshi application cross-referenced above, and have been discussed in sufficient detail herein to enable one skilled in the art to understand the improved feature of the present invention presented hereinafter. For a more detailed description of the construction of the BWR fuel assembly, attention is directed to both of the above cross-referenced Barry et al and Doshsi patent applications.

Coolant Flow Direction Control Device

Figure 4:
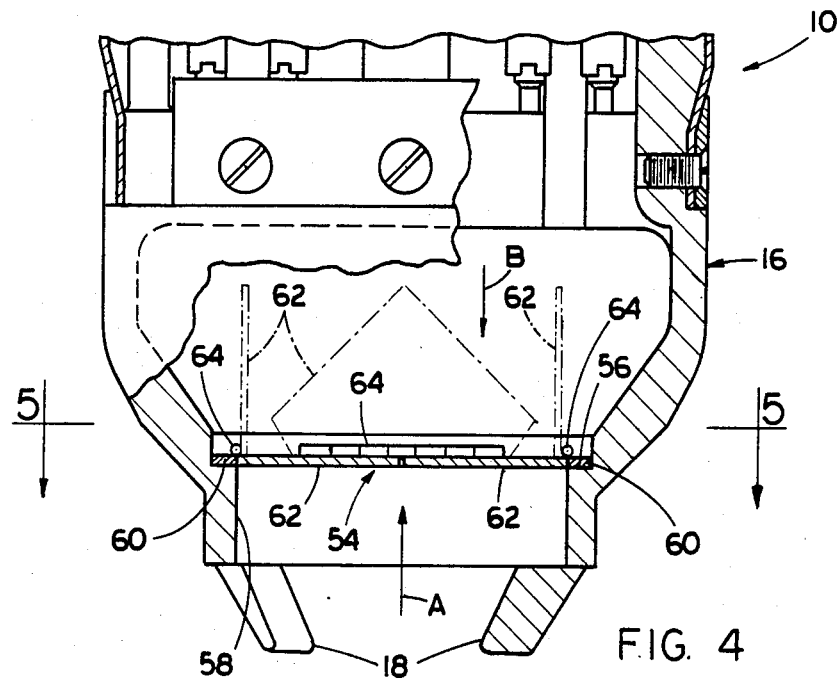
FIG. 4 is an enlarged fragmentary elevational view of the bottom nozzle of the fuel assembly of FIG. 1, with parts broken away and sectioned for clarity, showing the valve in solid line form extending across and closing the bottom nozzle inlet for preventing reverse coolant outflow from the bottom nozzle and in dashed line form pivoted away from and opening the inlet for allowing coolant inflow into the bottom nozzle.
Figure 5:
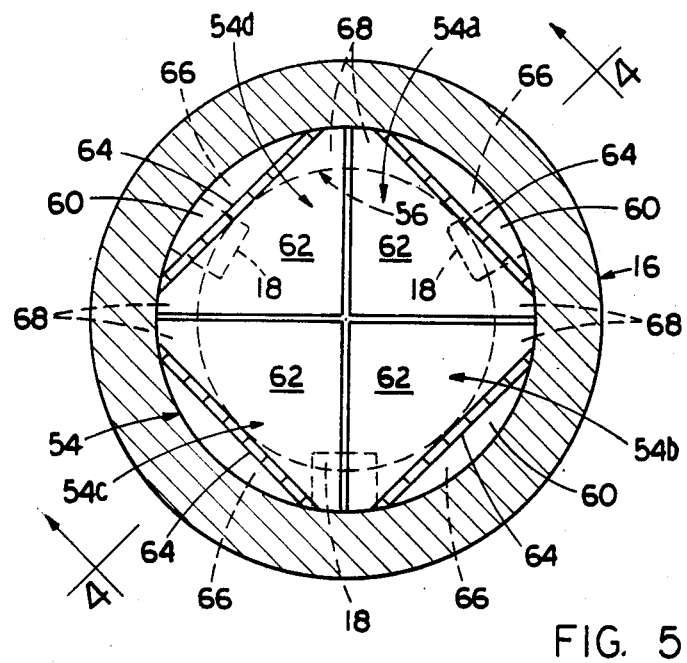
FIG. 5 is a sectional view of the bottom nozzle taken along line 5—5 of FIG. 4, showing a top plan view of the valve closing the bottom nozzle inlet.

Referring now to FIG. 1, and more specifically to FIGS. 3 to 5, there is seen the feature incorporated in the BWR fuel assembly 10 which constitutes the present invention, namely a coolant flow direction control device, generally indicated by the numeral 54. The flow direction control device 54 is mounted in the bottom nozzle 16 of the fuel assembly 10 on an annular ledge or surface 56 formed thereon at an inner end of an inlet 58 of the bottom nozzle so as to surround the inlet. In such location, the flow direction control device 54 is operable basically to open the inlet 58 to flow of coolant fluid in an inflow direction into the flow channel 12 through the bottom nozzle inlet 58 but close the inlet to flow of coolant fluid from the channel 12 through the bottom nozzle inlet upon reversal of coolant liquid flow from the inflow direction.

More particularly, the coolant flow direction control device 54 is preferably in the form of a one-way or unidirectional flow check valve positioned across the inlet 58 of the fuel assembly bottom nozzle 16. The coolant flow check valve 54 is operable to sense the direction of coolant flow through the inlet 58 and automatically, by action of the fluid on the valve, open when the flow direction sensed is into the bottom nozzle 16 (in the direction of arrow A in FIG. 4) and close when the flow direction sensed is out of the bottom nozzle (in the direction of arrow B in FIG. 4). In an exemplary embodiment, the flow check valve 54 is composed of four parts 54a,54b,54c,54d. Each part of the check valve 54 is quarter pie-shaped and has an outer portion 60 mounted to the bottom nozzle 16 on its annular surface 56 and adjacent to its inlet 58 and an inner portion 62 being connected to the respective outer portion 60 by a middle hinge portion 64 for pivotal movement relative to one another. The inner portions 62 of the valve 54 together pivot about the respective outer portions 60 between lowered positions, as seen in solid line form in FIGS. 4 and 5, and raised positions, as seen in broken line form in FIG. 4.

The inner valve portions 62 are configured to extend in close fitting relationship adjacent to one another and coplanarly across the inlet 58, as seen in FIGS. 4 and 5, so as to close it when disposed in their respective lowered positions. Then, when disposed in their respective raised positions, as seen in FIG. 4, the inner portions 62 extend in generally parallel relationship to the direction of flow A an are disposed remote from one another so as to open the inlet 58. The inner valve portions 62 are arranged in first and second pairs which, as depicted in FIG. 5, are angularly displaced about ninety degrees from one another. In such arrangement, the inner valve portions 62 of each pair are placed in opposing relation to one another such that one is a mirror image of the other. Additionally, the inner valve portions 62 located directly opposite to one another in the respective pairs thereof extend generally parallel to one another when in their raised positions.

The outer valve portions 60, in being mounted to the annular surface 56 of the bottom nozzle 16 which concentrically surrounds its inlet 58, are configured for attachment on respective circumferentially spaced sectors 66 of the surface 56, as seen in FIG. 5. The inner valve portions 62, when in their respective lowered positions as seen in FIG. 5, are configured for seating on respective circumferentially spaced segments 68 of the annular surface 56 which alternate with the spaced sectors 66 of the surface 56 and constitute the remainder thereof. Whereas in their raised positions the inner valve portions 62 extend toward the bottom nozzle 16 in the direction of coolant flow (arrow A) into the bottom nozzle, in their lowered positions their seating on the annular surface 56 stops them from pivoting past the lowered position so as to prevent them from extending away from the bottom nozzle 16 in a direction (arrow B) opposite to that of their raised positions which would allow reverse flow of coolant therefrom.

Thus, the primary characteristic of the flow direction control device 54, whatever specific form it might take, should be that it provides unrestricted flow through the bottom nozzle inlet 58 into the fuel assembly during normal operation. Then, upon occurrence of LOCA flow reversal (initiation of core coolant inventory depletion), the flow reversal should cause the device to shut automatically, preventing any further depletion via the bottom nozzle. A principle requirement of this device should be reliability in operation and freedom from corrosion. The material of the device 54 might be a titanium alloy. The advantage of having multiple closure members or portions making up the device 54 is that in case one portion gets stuck and fails to close upon flow reversal, the others would then introduce a partial closure, which would still be beneficial. However, it is possible to use only one closure member.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a nuclear reactor having a flow of coolant/moderator fluid therein, at least one fuel assembly installed in the fluid flow, said fuel assembly comprising in combination:
   a bundle of elongated fuel rods disposed in side-by-side relationship so as to form an array of spaced fuel rods;
   an outer tubular flow channel surrounding said fuel rods so as to direct the flow of coolant/moderator fluid along said fuel rods;
   bottom and top nozzles mounted at opposite ends of said flow channel and having an inlet and outlet respectively for allowing entry and exit of the flow of coolant/moderator fluid into and from said flow channel and along said fuel rods therein, said bottom nozzle having an annular surface defined therein so as to surround said inlet thereof, said annular surface having circumferentially spaced sectors and circumferentially spaced segments which alternate with said spaced sectors; and
   a coolant flow direction control device operatively disposed in said bottom nozzle so as to open said inlet thereof to the flow of coolant/moderator fluid in an inflow direction into said flow channel through said bottom nozzle inlet but close said inlet to the flow of coolant/moderator fluid from said flow channel through said bottom nozzle inlet upon reversal of coolant/moderator fluid flow from the inflow direction;
   said coolant flow direction control device being a unidirectional flow check valve positioned across said inlet of said bottom nozzle for sensing the direction of coolant/moderator fluid flow and automatically opening when the flow direction sensed is into said bottom nozzle and closing when the flow direction sensed is out of said bottom nozzle;
   said flow check valve including a plurality of outer portions mounted to said respective circumferentially spaced sectors of said bottom nozzle annular surface surrounding said inlet thereof, and a plurality of inner portions being pivotably connected to said respective outer portions for pivotal movement toward and away from one another between lowered and closed and raised open positions;
   said inner valve portions, when in their raised positions, extending toward said bottom nozzle in the direction of coolant flow into said bottom nozzle, said inner valve portions being configured to extend in close fitting relationship adjacent to one another and coplanarly across said inlet so as to close said inlet when disposed in their respective lowered positions and to extend in generally parallel relationship to the direction of coolant flow and be located remote from one another so as to open said inlet when disposed in their respective raised positions;
   each of said inner valve portions, when in its lowered position, has opposite lateral edge portions that seat on respective surface portions of the two segments located on opposite ends of said sector to which the respective outer portion of said valve is mounted, said inner valve portions in seating on said spaced segments of said bottom nozzle annular surface being stopped by said surface from pivoting past their lowered positions in which they would extend away from said bottom nozzle and allow reverse flow of coolant therefrom;
   said inner valve portions being arranged in first and second pairs which are angularly displaced about ninety degrees from one another wherein said inner valve portions of each pair are placed in opposing relation to one another such that one is a mirror image of the other, said inner valve portions located directly opposite to one another in said respective pairs thereof extending generally parallel to one another when in said raised positions.

* * * * *